United States Patent [19]
Martinez

[11] 3,986,961
[45] Oct. 19, 1976

[54] FLUID MANIFOLD FOR MASS TRANSFER DEVICES

[75] Inventor: Felix Jesus Martinez, Demarest, N.J.

[73] Assignee: Erika, Inc., Englewood Cliffs, N.J.

[22] Filed: Aug. 1, 1975

[21] Appl. No.: 600,961

[52] U.S. Cl. ..................... 210/321 B; 210/494 M; 210/541
[51] Int. Cl.² .................................... B01D 31/00
[58] Field of Search ........ 210/321 R, 321 A, 321 B, 210/433 M, 493 M, 494 M, 541; 285/260

[56] References Cited
UNITED STATES PATENTS

| | | |
|---|---|---|
| 2,664,395 | 12/1953 | Marchand ..................... 210/321 A |
| 3,077,268 | 2/1963 | Gobel et al ..................... 210/321 B |
| 3,508,662 | 4/1970 | Miller ........................... 210/541 X |
| 3,712,474 | 1/1973 | Martinez ....................... 210/541 X |
| 3,880,760 | 4/1975 | Flandoli ..................... 210/494 M X |

*Primary Examiner*—Charles N. Hart
*Assistant Examiner*—Robert H. Spitzer
*Attorney, Agent, or Firm*—Morgan, Finnegan, Pine, Foley & Lee

[57] ABSTRACT

An improved fluid manifold for mass transfer devices in which a rigid retainer member and a rigid receptacle coact to compressively retain an elastomeric band and tubular membrane therebetween to provide a hermetic seal between the interior of the membrane and a port in the manifold.

16 Claims, 15 Drawing Figures

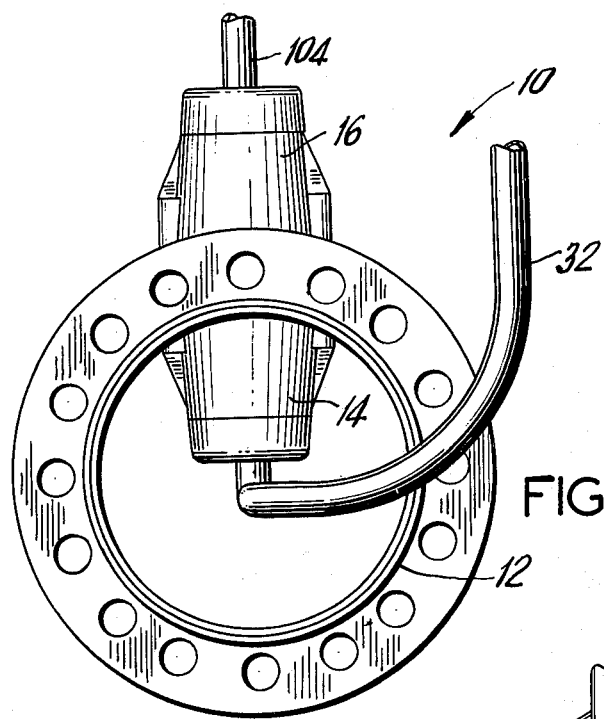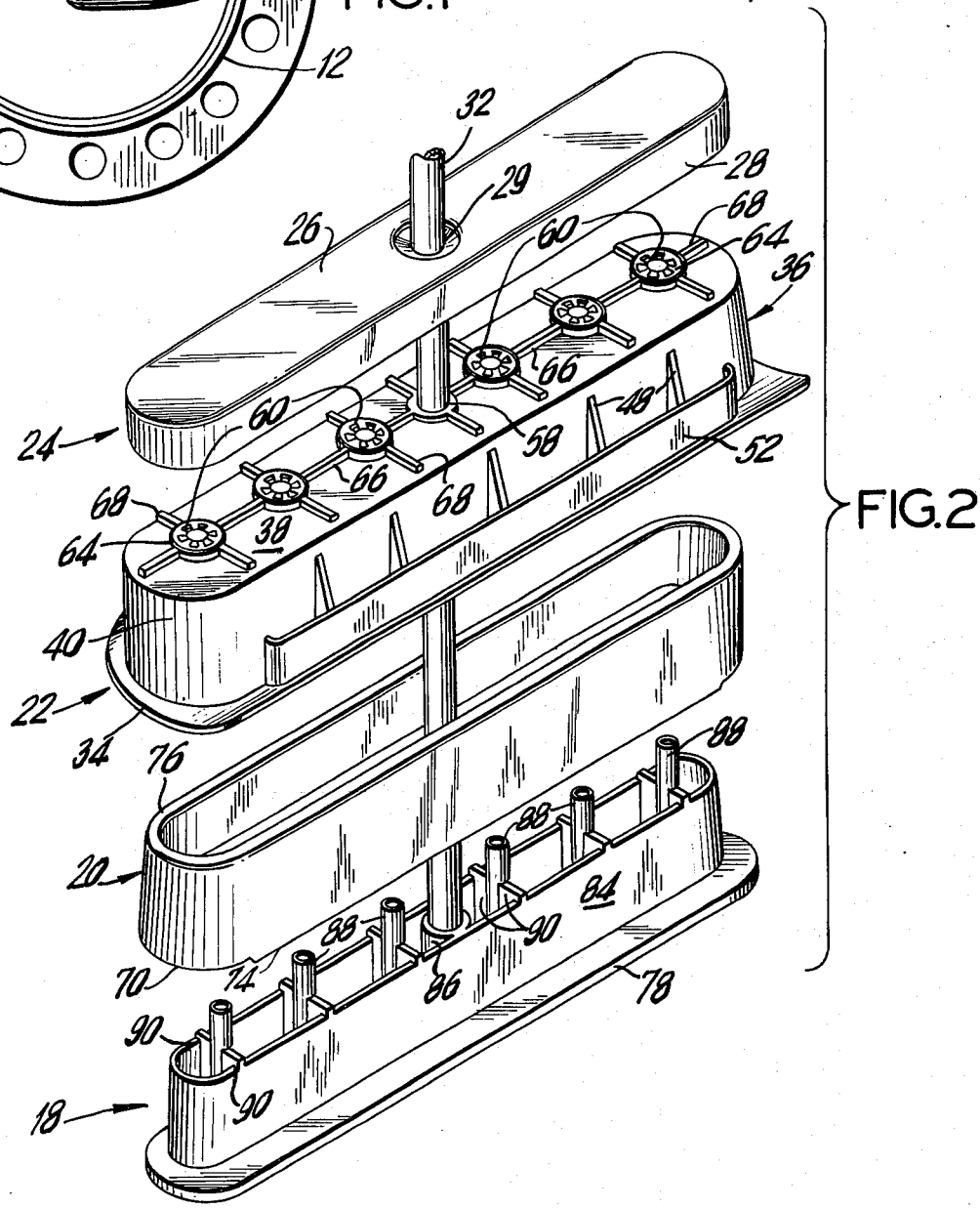

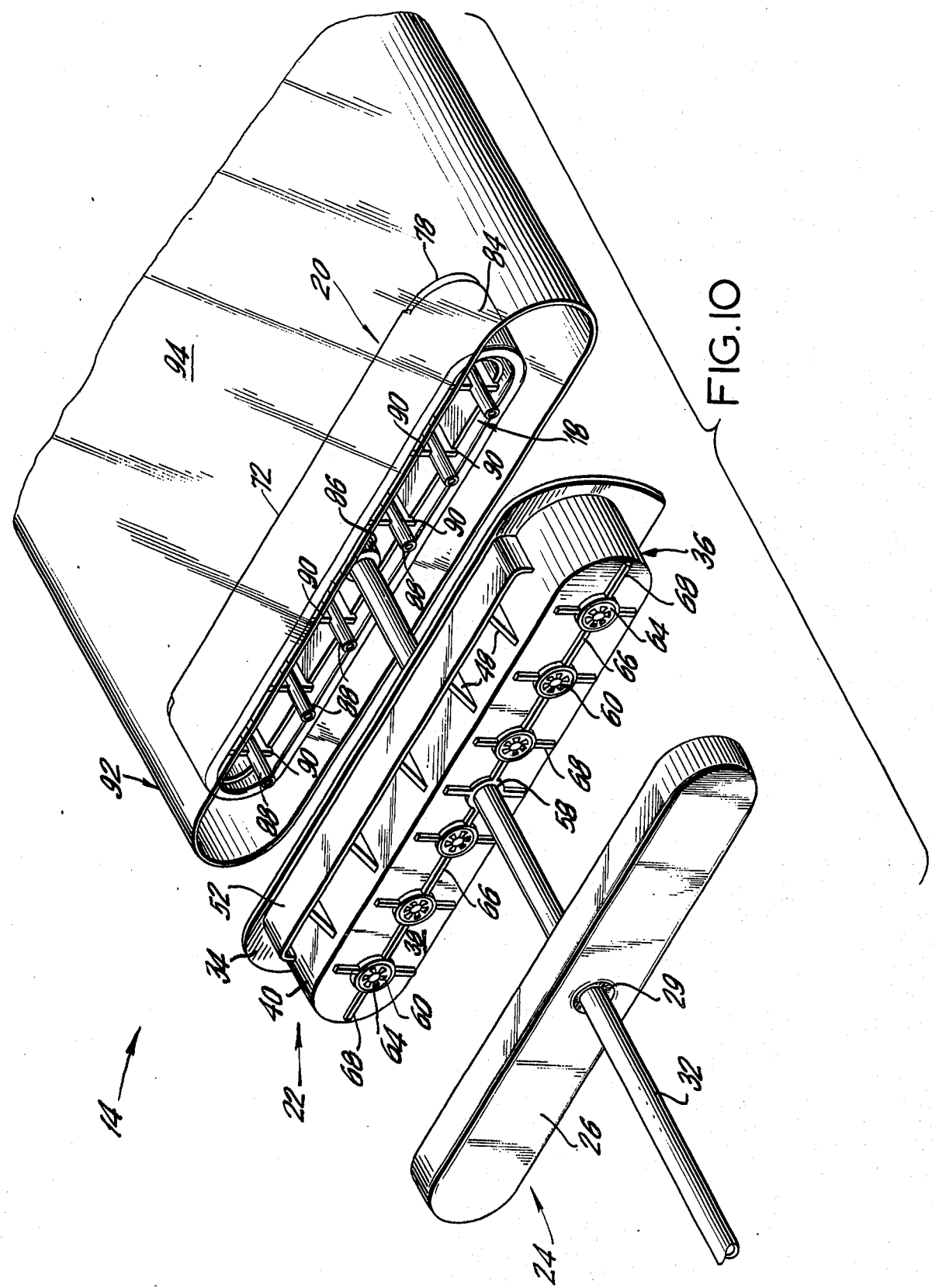

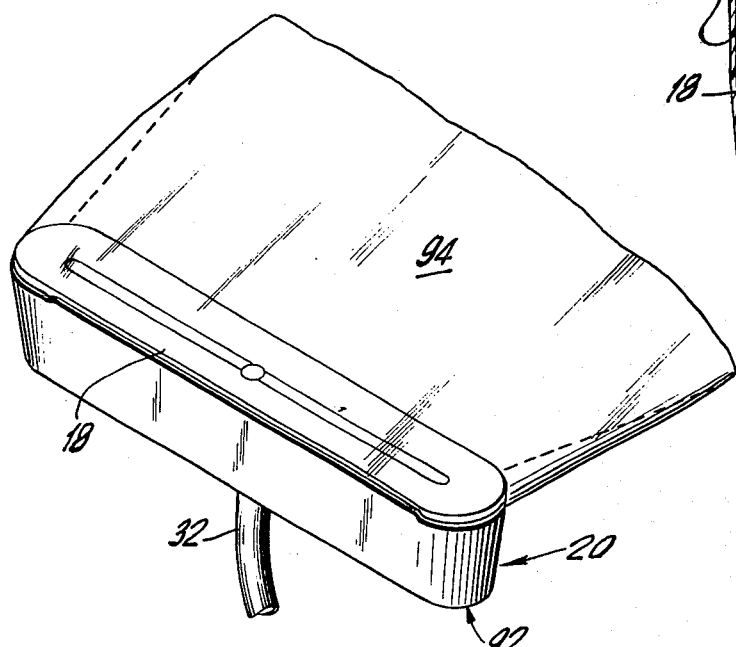
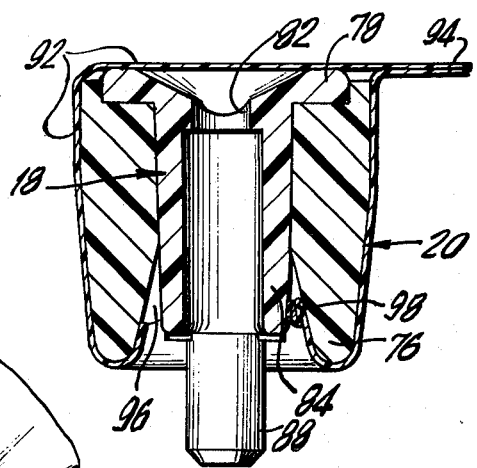
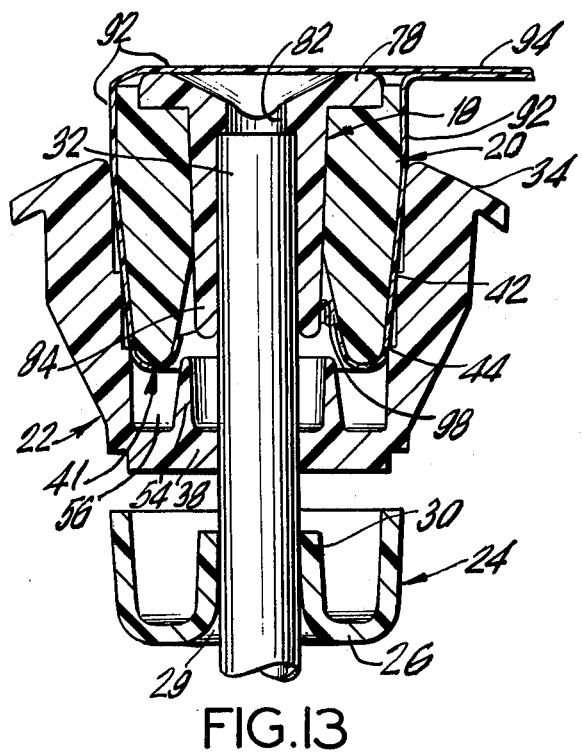
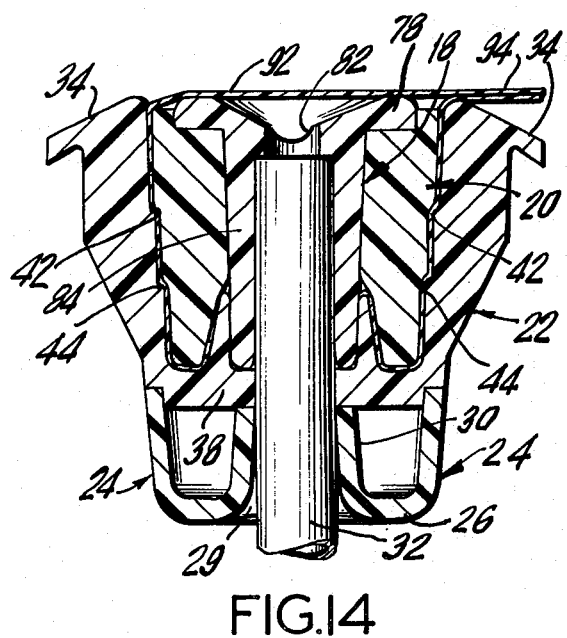

FLUID MANIFOLD FOR MASS TRANSFER DEVICES

The present invention relates to fluid manifolds, and more particularly to an improved fluid manifold for mass transfer devices.

Generally, connectors or adapters used in mass transfer device utilize resilient plugs which are friction fitted into an outer housing and attempt to obtain sealing of a membrane by wedging the membrane between an o-ring and the plug and/or the inside wall of the housing, see U.S. Pat. Nos. 3,508,662 (Miller III) and 3,712,474 (Martinez). Such connectors are less than satisfactory in at least three respects:

1. The interference fit between the membrane and outer housing created by the plug does not provide sufficient force to achieve a hermetic seal;
2. When coupling the membrane to the connector the resulting wrinkles introduced in the membrane are not effectively compressed to provide a hermetic seal; and
3. There is no positive locking means to prevent the membrane from dislodging from the connector during use.

It is an object of the present invention to provide a fluid manifold which provides a positive hermetic seal.

It is a further object of the present invention to provide a fluid manifold which provides a positive hermetic seal to a membrane even in the presence of wrinkles.

It is a still further object of the present invention to provide a positive locking of the membrane in the connector.

Other objects, aspects, and advantages of the present invention will be apparent from the detailed description and the drawings.

Briefly, an improved fluid manifold is provided in accordance with the present invention including a rigid retainer member having a port therein, an elastomeric band dimensioned to be mounted circumjacent said retainer member and having the end portion of a tubular membrane mounted thereabout, a rigid receptacle for receiving the elastomeric band, membrane end mounted thereabout, and the rigid retainer member, the rigid receptacle including compression means for exerting compressive forces on said elastomeric band and the end portion received by said rigid receptacle, and clamping means for fixedly retaining the rigid retainer member in the rigid receptacle to hold the elastomeric band and end portion of the tubular membrane fixedly positioned therein, the rigid retainer member, elastomeric band and rigid receptacle coacting to provide a hermetic seal between the interior of the membrane and the port of the rigid retainer member.

The preferred embodiment of the present invention is illustrated in the drawings, which should be considered as illustrative of the features of the present invention without being construed to limit the present invention solely thereto. The drawings are as follows:

FIG. 1 is an end view of a mass transfer device with inlet and outlet fluid manifolds in accordance with the present invention;

FIG. 2 is an exploded perspective view of the components of the inlet fluid manifold of FIG. 1;

FIG. 10 is an exploded view of the inlet fluid manifold in the process of being coupled to one end of a tubular membrane;

FIG. 11 is a perspective view of an assembled rigid retainer member and elastomeric band rotated 90° for facilitating folding and tucking of the membrane therein;

FIG. 12 is a cross-sectional view of the assembled rigid retainer member and elastomeric band showing the end portion of the tubular membrane arranged thereabout;

FIG. 13 is a cross-sectional view of the assembly of FIG. 13 partially inserted in the rigid receptacle;

FIG. 14 is a cross-sectional view of the assembly of FIG. 13 fully inserted in the rigid receptacle with the cover mounted thereon.

Referring to FIG. 1, a mass transfer device 10 is illustrated. Such devices 10 may be used in an artificial kidney, oxygenation, artificial organ apparatus, or other mass transfer devices. Such mass transfer devices 10 may include an inner plastic core 12 having spirally wound alternating layers of a support screen and a flat rectangular tubular membrane (not shown) arranged thereabout. Coupled to the inlet and outlet ends of the tubular membrane of the device 10 are inlet and outlet fluid manifolds 14 and 16, respectively, which embody the features and objects of the present invention. Generally, the fluid is a body fluid, e.g., blood.

Figure 3:
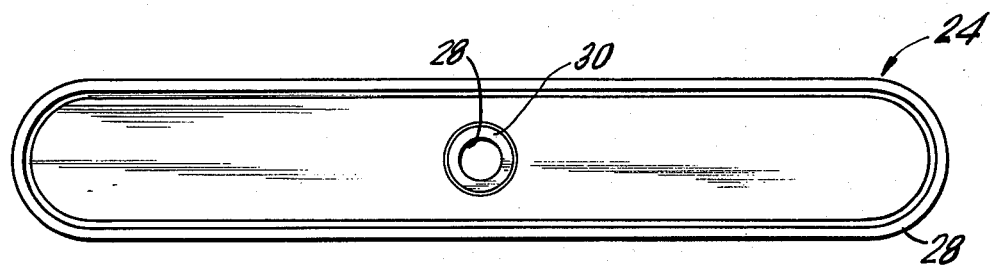
FIG. 3 is a bottom plan view of the cover for the rigid receptacle.

Referring to FIG. 2, the inlet fluid manifold 14 includes a rigid retainer member 18, an elastomeric band 20, a substantially rigid receptacle 22, and a receptacle cover 24. With reference also to FIG. 3, the receptacle cover 24 includes a top surface 26 with a depending tapering annular sidewall 28 dimensioned to be mounted on the top of the rigid receptacle 22. Centered in the top surface 26 is a recessed aperture 29 with a concentric sleeve 30 depending therefrom for receiving a conduit or tube 32, here an inlet tube, see FIG. 1.

Figure 4:
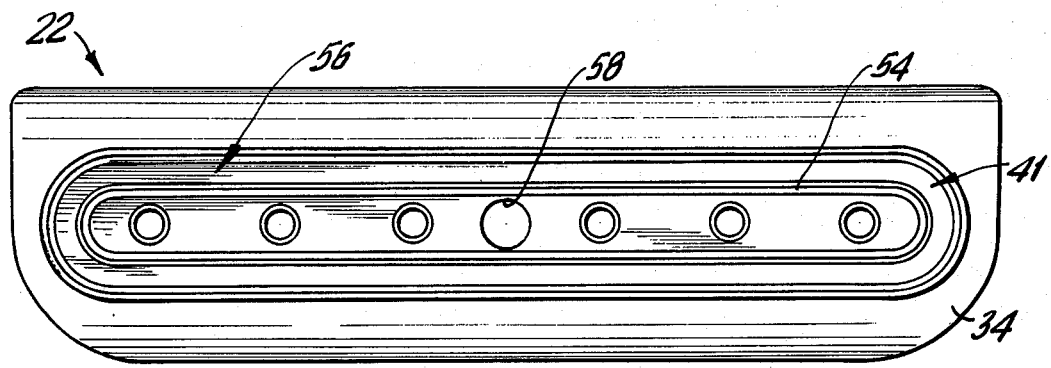
FIG. 4 is a bottom plan view of the rigid receptacle.
Figure 5:
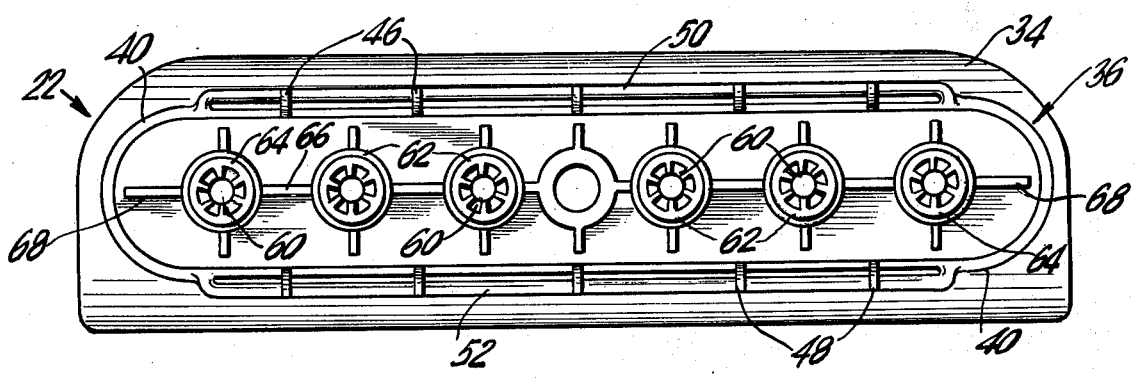
FIG. 5 is a top plan view of the rigid receptacle.

With reference also to FIGS. 4 and 5, the rigid receptacle 22 includes a curved flange or skirt 34 for mounting on the core 12 and an upstanding annular body member 36 which terminates at a top wall 38. The body member 36 has tapering sidewalls 40 for forming a tapered cavity 41 therein. The tapered cavity 41 includes annular or concentric rings or steps 42 and 44 arranged on the interior surface of its sidewalls 40, see FIGS. 13 and 14.

Arranged on the exterior surface of sidewalls 40 are a plurality of transverse ribs 46 and 48. Ribs 46 are integrally joined to a longitudinal strut 50 and ribs 48 are integrally joined to a longitudinal strut 52. The struts 50 and 52 are joined at their ends to sidewalls 40 and at their bottom to the skirt 34. The ribs 46 and 48 and struts 50 and 52 reinforce the sidewalls 40 to limit the lateral flexibility thereof.

Depending from the interior surface of the top wall 38 is an annular tapered ring 54 which defines an annular space or seat 56 between the ring 54 and interior surface of the sidewalls 40. Centrally arranged within the top wall 38 is an aperture 58 for receiving the tube 32. Symmetrically arranged in the top wall 38 on each side of the aperture 58 and extending along the longitudinal axis of the rigid receptacle 22 are pin receiving apertures 60. The apertures 60 include outer enlarged concentric recesses 62 for receiving retainer rings 64. The retainer rings 64 may be of the type commercially known as Truarc rings, and include a metal ring with inwardly extending fingers. The enlarged concentric recesses 62 are interconnected with support ribs 66 and also include additional support ribs 68, all joined to the exterior surface of the top wall 38.

Figure 6:
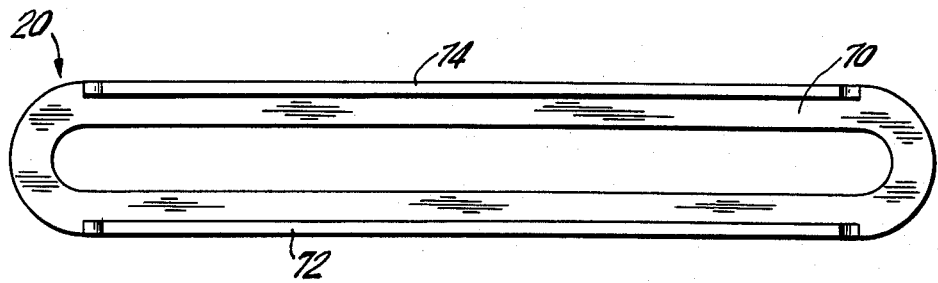
FIG. 6 is a bottom plan view of the elastomeric band.
Figure 7:
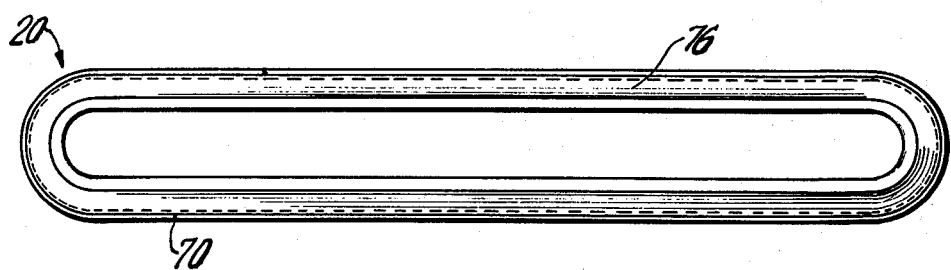
FIG. 7 is a top plan view of the elastomeric band.

With reference also to FIGS. 6 and 7, the elastomeric band 20, which is preferably a medically approved polymer having low durometer (30–80 Shore A) and desirable cold flow characteristics, such as a polymer of the 2,000 series sold under the name Kraton by Shell Chemical Co., includes a thickened bottom portion 70 with depending side cushions or ridges 72 and 74. The thickened bottom portion 70 extends upwardly for approximately one half the height of the elastomeric band 20, whereupon the band 20 tapers toward a thinned top portion 76. Thus, the opening in the elastomeric band 20 assumes a substantially Y-shape.

Figure 8:
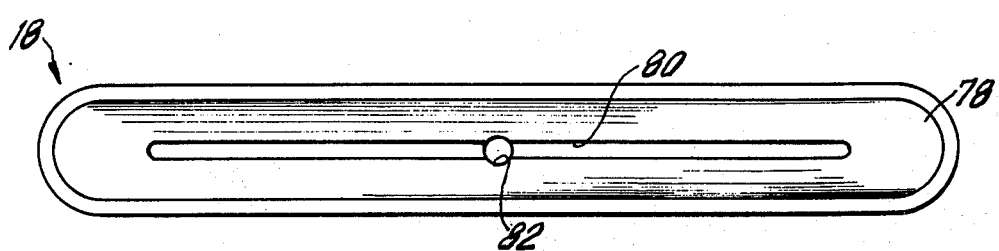
FIG. 8 is a bottom plan view of the rigid retainer member.
Figure 9:
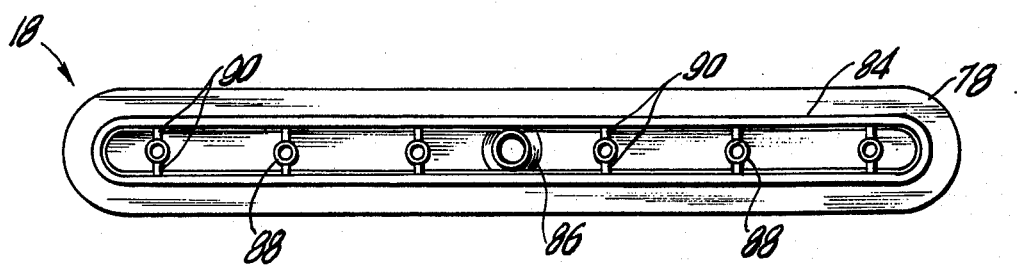
FIG. 9 is a top plan view of the rigid retainer member.

With reference also to FIGS. 8 and 9, the rigid retainer member 18 includes a bottom flange 78 with an elongate depression or recess 80 and a centrally arranged port 82. Extending upwardly from the flange 78 and centrally arranged thereon is a tapered body member 84 dimensioned to receive the elastomeric band 20 when the elastomeric band 20 is fitted therearound.

Centrally arranged within the tapered body member 84 and extending upwardly from the port 82 is a sleeve 86. The sleeve 86 receives the end portion of tube 32 which is fixed therein or thereon by a suitable adhesive, such as commercially available aromatic solvents, to provide a fluid-tight connection between the tube 32 and the port 82.

Symmetrically arranged on opposite sides of the sleeve 86 are upstanding hollow pins 88 which extend upwardly from the flange 78 and terminate at a point beyond the upper end of the body member 84. The hollow pins 88 are additionally supported by integrally formed struts 90 which join the hollow pins 88 to opposite sides of the inner surface of the body member 84 and the top surface of the flange 78. Advantageously, the hollow pins 88 are equal in number to the number of pin receiving apertures 60 and are dimensioned for insertion therein. The retainer rings 64 engage portions of the inserted pins 88 which extend through the apertures 60, so that the fingers of the retainer rings 64 and the pins 88 coact to provide an interference-fit which holds the rigid retainer member 18, and elastomeric band 20 mounted thereon, firmly fixing the rigid retainer member 18 within the cavity 41 of the receptacle 22 to prevent retraction therefrom.

Referring to FIG. 10, the components of the inlet fluid manifold 14 are shown in a partially assembled condition with the tube 32 extending therethrough and coupled to the rigid retainer member 18. The elastomeric band 20 has been fitted over the tapered body member 84 of the retainer member 18 so that its bottom portion 70 seats against the upper surface of flange 78 and cushions 72 and 74 overlie the peripheral sidewalls of the flange 78. The end portion 92 of a tubular membrane 94, preferably a flat rectangular semipermeable tubing such as Cuprophan available commercially from Enka Glanzstoff, Wuppertal, West Germany, is positioned over the assembled rigid retainer member 18 and the elastomeric band 20. Preferably, the assembled retainer member 18 and elastomeric band 20 are rotated 90° with the flange 78 at the top, see FIG. 11, and the corner portions of the membrane 94 are preferably creased forming pleats which are folded against the membrane 94, as disclosed in U.S. patent application Ser. No. 600,955, filed on even date herewith, and assigned to the same assignee as the instant application.

Referring to FIG. 12, upon assembly of the rigid retainer member 18 and elastomeric band 20 an annular space 96 is formed between the inner surface of the tapered thinned top portion 76 and the outer surface of the juxtaposed body member 84. The excess portion 98 of the membrane 94 which results from folding is advantageously tucked into the rear portion of the annular space 96.

Referring to FIGS. 13 and 14, the rigid retainer member 18 with the elastomeric band 20 mounted therearound and the end portion 92 of the membrane 94 positioned thereon are press-fitted into the cavity 41 of the rigid receptacle 22 until fully inserted therein. Advantageously, the top of the struts 90 of the rigid retainer member 18 engage the inner surface of the top wall 38 and serve as stops to prevent too great a compressive force from being applied during insertion. The insertion may be done initially manually and subsequently completed by a compression apparatus, e.g., pneumatic, hydraulic, and mechanical presses, as desired. After insertion has been completed the receptacle cover 24 is mounted on the rigid receptacle 22.

With reference to FIG. 14, upon completing insertion of the rigid retainer member 18, elastomeric band 20, and end portion 92 of the membrane 94 in the cavity 41 of the rigid receptacle 22, the elastomeric band 20 and end portion 92 of membrane 94 are laterally and vertically compressed between the rigid retainer member 18 and the rigid receptacle 22 with the top end of the thinned portion 76 seated in annular space 56 and ring 54 positioned in annular space 96. The transverse ribs 46 and 48 and longitudinal struts 50 and 52, respectively, add rigidity to and reinforce the compressive action of the sidewalls of the cavity 41 on the outer surface of the elastomeric band 20. Therefore, the elastomeric band 20, the end portion 92 of the membrane 94, which is in contact therewith, are forced to assume the stepped configuration of steps 42 and 44 on interior surface of the sidewalls 40 of cavity 41, thereby enabling the steps 42 and 44 to concentrate the resulting compressive forces on the end portion 92 of membrane 94. Additionally, the hollow pins 88 and retainer rings 64 coact to positively lock the rigid retainer member 18 in the cavity 41 of the receptacle enabling the thinned top portion 76 of the elastomeric band 20 to be compressively retained against the inside surface of the top wall 38 of space 56. This compressive action of the rigid receptacle 22 and rigid retainer member 18 on the elasatomeric band 20 and end portion 92 of the membrane 94 provides a hermetic seal (fluid-tight seal) between the interior of the membrane and the port 82 for transmitting fluid (blood) through the tube 32 to the interior of the membrane 94. Advantageously, the coaction between the hollow pins 88 and retainer rings 64 also anchors the rigid retainer member 18, elastomeric band 20, and end portion 92 of the membrane 94 in the cavity 41 and prevents displacement or retraction of these components from the cavity 41.

The elastomeric band 20 is effectively prevented from buckling by being compressed between the rigid walls of the retainer member 18 and sidewalls 40 of the cavity 41. Thus, the compressive forces are uniformly directed laterally against the sidewalls 40 of the rigid retainer member 18 and cavity 41 to achieve a hermetic seal with the end portion 92 of membrane 94. Additionally, vertical compressive forces wedge the end 92 of the membrane 94 between the thinned top portion 76 of the elastomeric band 20 and the inside surface of the top wall 38 of space 56 to provide a secondary hermetic seal with the end portion 92 of membrane 94. For example, compressive forces on the order of 50 lbs./in$^2$ are created against the walls of the cavity 41 to hermetically seal the membrane 94 between the walls of the rigid receptacle 22 and the elastomeric band 20 upon full insertion of the retainer member 18 and elastomeric band 20 within the cavity 41 with an attendant reduction in the height of the elastomeric band 20 by approximately 15% and a proportional increase in the thickness of the elastomeric band 20 by approximately 15%. Such forces can be achieved by exerting sufficient force on the rigid retainer member 18 during assembly of the manifold 10.

Figure 15:
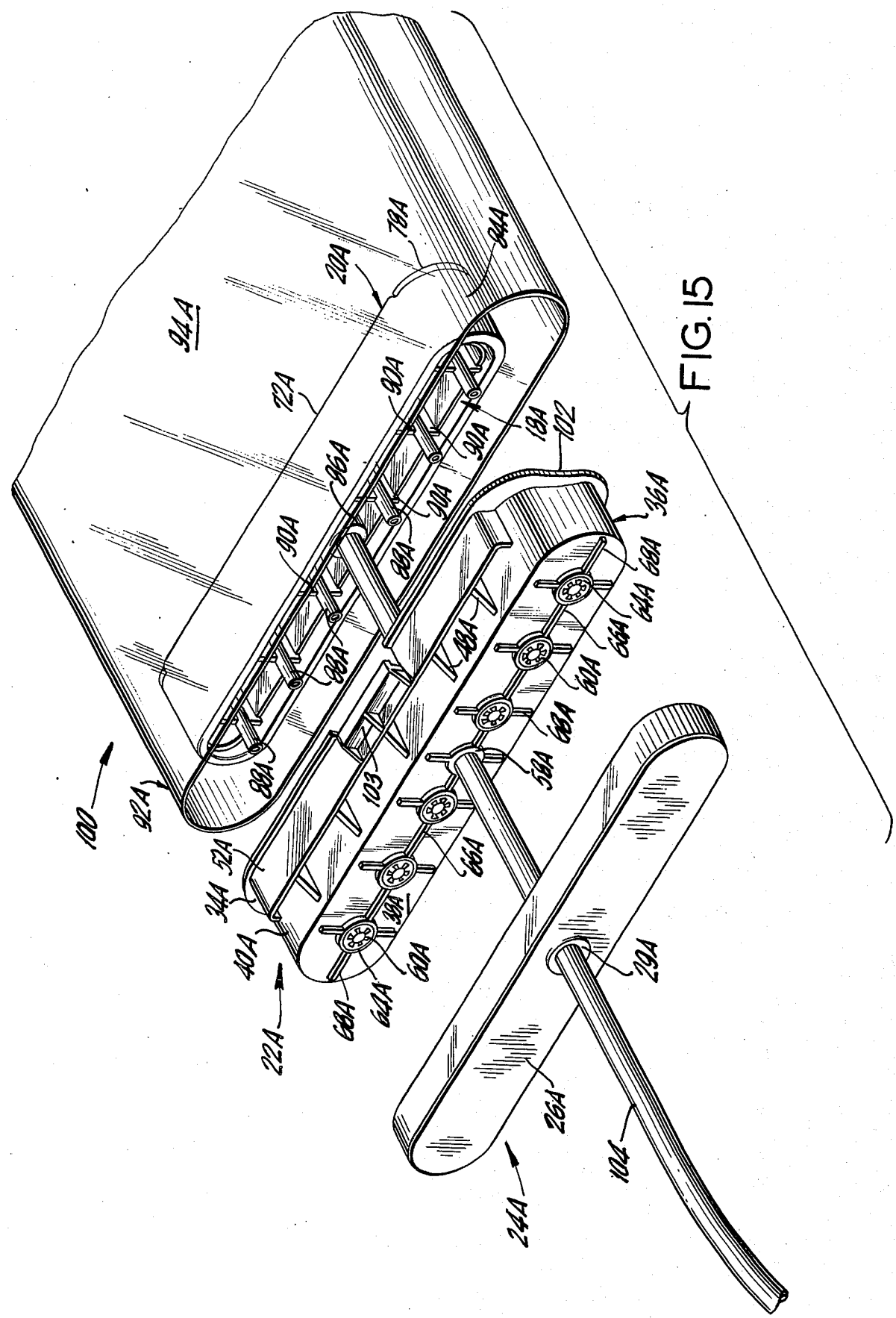
FIG. 15 is an exploded view similar to FIG. 10, but showing the outlet fluid manifold in the process of being coupled to the other end of the tubular membrane.

Referring to FIg. 15, outlet manifold 16 is shown partially assembled for coupling to the opposite end 100 of membrane 94. The outlet manifold 16 preferably has the same features and is assembled in an identical manner as the inlet manifold 14. Identical elements are indicated by numerals identical with those shown in FIG. 10, but followed by the suffix A. The only exceptions to this similarity between the inlet and outlet manifolds 14 and 16 is the skirt 102 of the outlet manifold 16 which has a configuration different from that of skirt 34 of the inlet manifold 14 to conform with the exterior of the mass transfer device 10, and the receptacle 22A includes a retainer peripheral ledge 103 for forming a locking means for the outer shell (not shown) of the mass transfer device 10. The skirt 34 of the inlet manifold 14 is mounted within a recess in the core 12 (not shown). Since the assembly and operation of the outlet manifold 16 is identical with that of the inlet manifold 14, a description of the former has been eliminated to avoid redundancy.

With the assembled device 10 as shown in FIG. 1, (inlet and outlet manifolds 14 and 16 coupled to the membrane 94), blood is introduced into the tube 32 and flows through the inlet manifold 14 into the tubular membrane 94. Subsequently, the blood exits from the membrane 94 through the outlet manifold 16 into an outlet tube 104, see FIG. 1.

Advantageously, the length of manifolds 14 and 16 is substantially as great as that of the width of the tubular membrane 94 to minimize the amount of folding of membrane 94 required and also minimize the amount of excess membrane which may result in the creation wrinkles. Thus, in both cases substantially the entire width of the membrane 94 is employed during entrance and exit of the blood through the mass transfer device 10. Advantageously, the longitudinal recess 80 is tapered toward the port 82 to create a substantial lower pressure drop along the length of the longitudinal recess 80 which is a fraction of the pressure drop of the fluid between the fluid passages of the mass transfer device 10 which extend between the inlet and outlet manifolds 14 and 16, thereby facilitating homogeneous fluid distribution through the fluid passages.

From the foregoing, it is apparent that the improved fluid manifold of the present invention provides a hermetic seal at the end of a membrane by containing a compressed elastomeric band 20 between the rigid retainer member 18 and the rigid receptacle 22 to prevent buckling of the elastomeric band 20, thereby enabling the elastomeric band 20 to concentrate substantially uniform lateral compressive forces about its perimeter to effect a hermetic seal with the end of the membrane 94. Additionally, a second hermetic seal is formed at the end of the membrane 94 as a result of the vertical compressive forces acting on the elastomeric band 20 and the end of the membrane 94 positioned or trapped therearound at the inner surface of annular space 56 of the rigid receptacle 22. Thus, a double hermetic seal is achieved.

It should be understood by those skilled in the art that various modifications may be in the present invention without departing from the spirit and scope thereof, as described in the specification and defined in the appended claims.

What is claimed is:
1. A fluid manifold for use with a mass transfer device, comprising:
   a rigid retainer member having a port therein;
   an elastomeric band dimensioned to be mounted circumjacent said rigid retainer member and having the end portion of a tubular membrane mounted thereon;
   a rigid receptacle for receiving said elastomeric band, the membrane end mounted thereon, and said rigid retainer member, said rigid receptacle including compression means for exerting compressive forces on said elastomeric band and the end portion of the membrane received by said rigid receptacle; and
   locking means for fixedly retaining said rigid retainer member in said rigid receptacle to maintain said elastomeric band and membrane fixedly positioned therebetween, said rigid retainer member, elastomeric band, and compression means coacting to hermetically seal the interior of the membrane to said port of said rigid retainer member.
2. The fluid manifold recited in claim 1, wherein:
   said compression means includes a tapered compression cavity having concentric steps formed on the inner surface of the sidewalls of said tapered compression cavity.
3. The fluid manifold recited in claim 2, wherein:
   said compression means includes tranverse ribs integrally formed on said rigid receptable and longitudinal struts integrally coupled to said ribs for limiting the lateral flexibility of said rigid receptacle.
4. The fluid manifold recited in claim 1, wherein:
   said locking means includes a plurality of pins extending upwardly from said rigid retainer member, a plurality of apertures formed in said rigid receptacle to receive said pins, and retainer rings for engaging portions of said pins received by said apertures.
5. The fluid manifold recited in claim 2, wherein:
   said tapered compression cavity includes an annular seat for receiving the top end of said elastomeric band thereagainst.
6. The fluid manifold recited in claim 5, wherein:

said locking means maintains compressive forces on said elastomeric band against said annular seat of said tapered compression cavity to provide further hermetic sealing of the end of the membrane compressed against said annular seat.

7. The fluid manifold recited in claim 1, wherein:
the height of said elastomeric band is decreased upon full insertion into said rigid receptacle and the thickness of said elastomeric band increases proportionally to laterally seal the end portion of the tubular membrane between said elastomeric band and said rigid receptacle.

8. The fluid manifold recited in claim 2, wherein;
said concentric steps of said tapered compression cavity are in the form of annular rings which cause the adjacent surface of said elastomeric band and the end portion of the membrane sandwiched therebetween to assume a stepped configuration which conforms with the sidewalls of said tapered compression cavity to aid in providing a hermetic seal between the interior of the membrane and said port of said rigid retainer member.

9. The fluid manifold recited in claim 1, wherein:
said rigid retainer member includes a flange against which said elastomeric band is seated and stop means located remote from said flange for engaging an inner surface of said rigid receptacle upon full insertion therein.

10. The fluid manifold recited in claim 1, wherein:
said rigid retainer member has tapering sidewalls;
said elastomeric band has tapering sidewalls which conform to said tapered sidewalls of said retainer member, the upper end of said elastomeric band being thinner than its lower end to provide an annular space between said retainer member and said elastomeric band, said annular space receiving a mating annular ring of said rigid receptacle.

11. The fluid manifold recited in claim 1, wherein:
said rigid retainer member includes a recess leading to said port, said recess providing a fluid flow path of low fluid resistance to facilitate distribution of a fluid across the fluid manifold.

12. A fluid manifold for use with a mass transfer device, comprising:
a rigid retainer member having a flange with a port therein for communication with the interior of a tubular membrane, said rigid retainer having a tapered body portion with locking means extending upwardly therefrom;
an elastomeric band dimensioned to be received circumjacent said tapered body portion seated on such flange and adapted to receive the end portion of the tubular membrane; and
a rigid receptacle having a tapered compression cavity therein for compressively receiving said rigid retainer member and said elastomeric band and for compressing the tubular membrane and said elastomeric band between said tapered body member of said retainer member and the sidewalls of said compression cavity, said cavity including a plurality of concentric steps for concentrating compressive forces on said elastomeric band and the end portion of the tubular membrane and reinforcing means integrally formed with said receptacle for limiting the lateral flexibility thereof, said rigid receptacle further including retaining means for engaging said locking means of said rigid retainer member to hold the same in said tapered compression cavity, said elastomeric band being held between said rigid retainer member and said rigid receptacle to concentrate compressive forces about the end of the membrane to provide a lateral hermetic seal thereto and said elastomeric band being held against the inner surface of the top wall of said tapered compression cavity to further concentrate compressive forces against any membrane portions trapped therebetween to provide a further hermetic seal thereto.

13. The fluid manifold recited in claim 12, wherein:
said locking means of said rigid retainer member includes pins;
said retaining means includes retainer rings mounted about apertures for receiving said pins.

14. The fluid manifold recited in claim 12, wherein:
said reinforcing means includes transverse ribs coupled to the exterior surface of said rigid receptacle and longitudinal struts coupling said ribs.

15. The fluid manifold recited in claim 12, wherein:
said rigid receptacle includes an annular ring depending from its top wall for forming an annular seat to receive the top end of said elastomeric band.

16. A fluid manifold for hermetically sealing the tubular membrane of a mass transfer device, comprising:
a rigid retainer member including a port;
an elastomeric band circumjacent about said rigid retainer member;
a substantially rigid compression cavity for receiving said rigid retainer member and said elastomeric band mounted thereon;
locking means for locking said rigid retainer member and said elastomeric band in said substantially rigid compression cavity upon full insertion therein, upon full insertion said elastomeric band compressively engaging the top wall of said compressive cavity to form a hermetic seal therewith and undergoing a decrease in height, said elastomeric band being contained between said rigid retainer member and said substantially rigid compression cavity so that buckling ofo said elastomeric band is prevented, enabling the thickness of said elastomeric band to undergo an increase proportional to the decrease in height to allow substantially uniform lateral compressive forces against said substantially rigid compression cavity and the end portion of a tubular membrane positioned therebetween to effect a hermetic seal between the end portion of the tubular membrane and said port.

* * * * *